Patented Aug. 10, 1937

2,089,181

UNITED STATES PATENT OFFICE 2,089,181

SYNTHETIC RESINS AND BALSAMS PREPARED FROM GLYCOL

Theodore F. Bradley, Westfield, N. J., assignor to Ellis-Foster Company, Montclair, N. J., a corporation of New Jersey No Drawing. Application May 23, 1927, Serial No. 193,743

12 Claims. (Cl. 260—8)

This invention relates to coating compositions containing resins and synthetic balsams prepared from glycols or their derivatives, and in one embodiment relates to compositions comprising nitrocellulose in admixture with such resins or synthetic balsams as may be made by chemically combining a dihydric alcohol with a polybasic acid.

While resins may be made by heating a polyhydric alcohol with a polybasic acid, but few of such resins are suitable for use as ingredients of nitrocellulose lacquers. Glycerol, for example, may be heated with phthalic acid or phthalic anhydride to form a resin. When theoretical or two molecular proportions of glycerol are heated with three molecular proportions of phthalic anhydride, deep seated polymerization results at about 235° C. or at a slightly lower temperature, with formation of an infusible resin, insoluble in all lacquer solvents. The exact temperature of such profound polymerization will vary with the time of heating, infusible products being formed at temperatures as low as 150 to 180° C. if a sufficiently protracted exposure to heat is allowed. For this reason phthalic glyceride resin has been found useful in the production of mica cements and certain molding compositions. If the heating of this resin be discontinued just short of the final polymerization, a product is obtained which is soluble in acetone and a limited number of like solvents, but said product is found to be very highly acidic, the acid numbers obtained being as high as 150 to 180. Somewhat similar results are observed with glycerol by reacting with tartaric, citric, or similar polybasic acids, or when proportions other than the theoretical combining proportions are employed.

This invention comprehends resins and balsams which although reacted to a point well beyond the stage of rawness noted above, nevertheless, are quite soluble and are therefore much more suitable for use in nitrocellulose coating compositions. It is observed that when dihydric alcohols such as ethylene glycol, and the like, are heated with phthalic anhydride for the purpose of preparing a resin, infusible and insoluble products are not readily formed. For example, one molecular proportion of phthalic anhydride may be heated with one molecular proportion of ethylene glycol and the temperature carried even as high as 340° C., that is, over 100° higher than the above mentioned phthalic glyceride product, without formation of infusible or insoluble products. Thus, the following proportions by weight; these proportions being equivalent to equal molecular proportions, were heated to a temperature of 340° C. in one hour's time.

Product A

| | |
|---|---|
| Phthalic anhydride | 148 |
| Ethylene glycol | 62 |

A hard, tough resin, having an acid number of 36.8 was obtained. Despite this abnormally high temperature the resulting resin was found to be readily soluble in ethyl lactate, acetone, diacetone alcohol, ethers of ethylene glycol, ethyl oxybutyrate, mixtures of these solvents with benzenoid hydrocarbons, a mixture of denatured alcohol 50 parts by volume with benzol 50 parts by volume, parts by volume and other like solvents. Moreover, the resin was found to be extremely water-resistant, probably due to the completeness of the reaction. This is quite contrary to the usual observations made of the fusible phthalic glyceride resins which are fusible only because of the incompleteness of the reaction. The glycol resin is compatible with nitrocellulose and may be blended with it when proper solvent mixtures are employed. Such differences in properties between the glycol resins and the glycerol resins are quite surprising and lead to important new uses for the former. Various types of products varying from sticky liquids or synthetic balsams to solid and hard resins are obtained by employing slight excesses of the glycol, or by reacting molecular proportions at lower temperatures than previously indicated. These resins are very often suitable for use as coating materials without admixture of nitrocellulose, but in many cases it is advisable to admix enough nitrocellulose with the resin or synthetic balsams to produce a coating of increased hardness. In place of ethylene glycol, one may employ other glycols such as propylene or butylene glycols, and the like, or dihydroxy ethyl ether, commercially known as diethylene glycol. This compound has been found to be even more active in preventing polymerization of phthalic glyceride resins and when reacted with phthalic anhydride forms a synthetic resin appreciably softer than the corresponding resin made from ordinary ethylene glycol. Other homologues such as triethylene glycol and still higher homologues may likewise be employed. The propylene or butylene glycols and their ether derivatives likewise may be utilized, also mixtures of these various hydroxylated bodies.

Product B

| | Parts by weight |
|---|---|
| Dihydroxy ethyl ether (diethylene glycol) | 106 |
| Phthalic anhydride | 148 |

These raw materials are heated in a suitable container, aluminum being satisfactory for commercial operations and the temperature may be carried to 340° C. without formation of insoluble or infusible polymers. A resin is produced of a fairly hard, yet slightly plastic nature, being softer than the corresponding resin from ethylene glycol. A product made in this manner had an acid number of 35 and was soluble in acetone, diacetone alcohol, ethyl lactate, ethyl oxybutyrate, and similar solvents.

In place of phthalic anhydride several other types of polybasic carboxylic acids may be employed. Among those found suitable are maleic and sebacic acids. It has been found that citric and tartaric acids do not act similarly to the other polybasic carboxylic acids and have been found to form infusible polymerization products when heated with ethylene glycol or dihydroxy ethyl ether. The anomolous behavior of citric and tartaric acids is thought to be due to the hydroxy groups of these acids. It is considered that satisfactory types of resins may be obtained from non-hydroxylated polybasic carboxylic acids and glycols or their derivatives. Such resins as may be made from tartaric or citric acids and the glycols, if heated only to a stage just short of the critical polymerization temperature, are found to be either water soluble or easily attacked by water, and such resins are not, therefore, considered suitable for the purposes of this invention.

In addition to non-hydroxylated polybasic carboxylic acids, one may employ various monobasic carboxylic acids as modifying agents, among which acids suitable for the purpose are abietic acid (rosin), oleic, and the fatty acids from vegetable oils, benzoic, benzoyl benzoic, toluyl benzoic, and other like acids. The use of such acids in combination with polybasic carboxylic acids tends to produce synthetic balsams or softer types of resins and resinous plasticizers which are generally soluble in benzenoid hydrocarbons, alkyl acetates, or mixtures thereof, as well as in ketones and other nitrocellulose solvents. Such products are therefore of somewhat greater solubility than those made without the use of monobasic acids as modifying agents.

*Product C*

| | Parts by weight |
|---|---|
| Dihydroxy ethylene ether (diethylene glycol) | 28 |
| Phthalic anhydride | 32 |
| Distilled fatty acids of cottonseed oil | 18 |

This mixture may be heated to a temperature above the boiling point of glycerol, say, to 300° C. or higher. The mixture may be carried to this temperature in approximately one and one-half hours, or longer, to form a soft, very sticky synthetic balsam. The balsam has been made with an acid number of twenty, or less, and has been found to be soluble in toluol, butyl acetate, mixtures thereof, and in other ordinary types of lacquer solvents. This material is suitable for blending with nitrocellulose, and if sufficient of the balsam is used, no ordinary type of plasticizer is required. This material may also be used as an adhesive or sticking agent.

All of the foregoing synthetic resins and balsams as exemplified are suitable for use in nitrocellulose coatings and such use constitutes one embodiment of this invention.

It is thus observed that a variety of synthetic balsams and resins may be made from non-hydroxylated polybasic carboxylic acids and dihydric compounds, or from mixtures of said polybasic acids, monobasic carboxylic acids and dihydric compounds; said balsams and resins in the preferred embodiment being characterized by relatively low acid numbers (preferably below 40), by their solubility in nitrocellulose solvents and compatibility for nitrocellulose and by their relatively non-polymerizing nature, being capable of exposure to a temperature above the boiling point of glycerol without the formation of insoluble, highly acid products such as are obtained from the corresponding glyceride derivatives.

Such balsams and resins as are herein specifically described may be dissolved in such solvents as are indicated and may then be blended with nitrocellulose, and with other resins, plasticizers, pigments or dyes, to form lacquers, lacquer enamels and stains. For example, clear lacquers suitable for application by means of a paint brush, as well as by spray or dip methods may comprise

| | Parts by weight |
|---|---|
| Synthetic resin (product A) | 20 |
| One-half second nitrocellulose | 10 |
| Dibutyl phthalate | 5 |
| Monoethyl ether of ethylene glycol | 40 |
| Toluol | 40 |

Pigment may be ground in this mixture in a ball mill, or other suitable means employed to form a colored lacquer or lacquer enamel. The exact amount of pigment will vary with the particular one used, about 20 parts by weight of zinc oxide or titanium oxide being a satisfactory addition to above formula for a white composition.

Another type of lacquer may comprise

| | Parts by weight |
|---|---|
| Synthetic balsam (product C) | 15 |
| One-half second nitrocellulose | 10 |
| Butyl propionate | 20 |
| Butyl acetate | 20 |
| Butyl alcohol | 20 |
| Toluol | 30 |

If a colored lacquer or enamel is desired pigment may be ground therewith in a ball mill or by other suitable means, about 20 parts by weight of pigment such as zinc oxide or titanox being satisfactory as a white.

Various other types of lacquers may be made from these synthetic balsams and resins and I do not therefore desire to limit this invention to any particular type of coating composition or lacquer, it being understood that any coating composition containing said balsams or resins alone, or in admixture with nitrocellulose, cellulose acetate and other soluble cellulose derivatives, ordinary resins, pigment or plasticizer, is within the purview of this invention. In order to obtain the full value of these synthetic resins and balsams, when employed with nitrocellulose, it is advisable, in most cases, to employ greater amounts of these synthetics than nitrocellulose, as observations have indicated that some of these products are more durable than the clear nitrocellulose itself, this being contrary to such action as ordinary natural resins produce. Thus, such synthetic resins and balsams as are herein disclosed may even exert a protective or preservative action on nitrocellulose, leading to the production of more durable coatings than can be obtained through the use of ordinary types of natural resins and balsams. Contrary to ordinary practice therefore, the resin in excess is admixed with a small amount of nitrocellulose instead of vice versa. It is more desirable when employing the products of this invention to base the composition upon the synthetic resin or balsam which is preferably used in excess, merely securing the desired degree of hardness through the use of a small amount of cellulose ester such as nitrocellulose, cellulose acetate, cellulose ethers, and the like. Thus, 1 part of nitrocellulose may be incorporated with from, say, 2 to 10 parts of the synthetic product. Quick drying lacquers yielding a substantial coating thus result, quite different in properties from the usual solutions heretofore employed as nitrocellulose lacquers.

What I claim is:—

1. As new compounds, the diethylene glycol ethyl ether esters of polycarboxylic acids.

2. As a new compound, a diethylene glycol ethyl ether ester of phthalic acid.

3. A composition of matter, including a diethylene glycol ethyl ether ester of phthalic acid.

4. A composition of matter comprising a reaction product of a dihydric alcohol and sebacic acid.

5. A composition of matter comprising the reaction product of diethylene glycol and sebacic acid.

6. A process for preparing a resin which comprises heating to reaction temperature a dihydric alcohol and sebacic acid.

7. A composition of matter comprising a mixed ester of an acidic gum, a dihydric alcohol and sebacic acid.

8. A composition of matter comprising a mixed ester of colophony, a dihydric alcohol, and sebacic acid.

9. A composition of matter comprising a mixed ester of an acidic gum, diethylene glycol, and sebacic acid.

10. A composition of matter comprising a mixed ester of colophony, diethylene glycol, and sebacic acid.

11. The process of preparing a resin which comprises heating to reaction temperature colophony, a dihydric alcohol and sebacic acid.

12. A composition of matter comprising the condensation product of sebacic acid, an aliphatic monobasic acid derived from the hydrolysis of a natural fatty oil glyceride, and a dihydric alcohol.

THEODORE F. BRADLEY.